United States Patent
Ma

(10) Patent No.: US 10,282,654 B2
(45) Date of Patent: May 7, 2019

(54) TAG ASSEMBLY METHODS

(71) Applicant: Interlake Research, LLC, Bellevue, WA (US)

(72) Inventor: Yanjun Ma, Bellevue, WA (US)

(73) Assignee: Interlake Research, LLC, Bellevue, WA (US)

( * ) Notice: Subject to any disclaimer, the term of this patent is extended or adjusted under 35 U.S.C. 154(b) by 0 days.

(21) Appl. No.: 15/831,651

(22) Filed: Dec. 5, 2017

(65) Prior Publication Data

US 2019/0012589 A1   Jan. 10, 2019

Related U.S. Application Data

(60) Provisional application No. 62/538,735, filed on Jul. 30, 2017, provisional application No. 62/534,686, filed on Jul. 20, 2017, provisional application No. 62/530,198, filed on Jul. 9, 2017.

(51) Int. Cl.
   *G06K 19/06*   (2006.01)
   *G06K 19/077*   (2006.01)

(52) U.S. Cl.
   CPC . *G06K 19/07773* (2013.01); *G06K 19/07718* (2013.01)

(58) Field of Classification Search
   CPC ....... H01L 2924/00; H01L 2924/00014; H01L 2224/48091; H01L 2924/181; H01L 2224/32225; H01L 2924/00012; H01Q 7/00; H01Q 1/2225; H01Q 1/38; G06K 19/07749; G06K 19/07779; G06K 19/07745; G06K 19/0775
   USPC ......................................................... 235/492
   See application file for complete search history.

(56) References Cited

U.S. PATENT DOCUMENTS

| | | | | |
|---|---|---|---|---|
| 5,696,666 | A * | 12/1997 | Miles ...................... | H01L 23/13 257/684 |
| 6,568,600 | B1 * | 5/2003 | Carpier ............ | G06K 19/07749 235/487 |
| 2007/0051807 | A1 * | 3/2007 | Yamaguchi .......... | G06K 7/0008 235/451 |
| 2008/0035741 | A1 * | 2/2008 | Sakama ........... | G06K 19/07749 235/492 |
| 2016/0275391 | A1 * | 9/2016 | Sattlegger ........ | G06K 19/07775 |
| 2017/0115511 | A1 * | 4/2017 | Beaton ..................... | G02C 7/04 |

* cited by examiner

*Primary Examiner* — Thien M Le
(74) *Attorney, Agent, or Firm* — Turk IP Law, LLC

(57) ABSTRACT

Embodiments are directed to assembling an RFID tag through wire bonding techniques. In some examples, the RFID tag may be assembled by wire bonding of an RFID integrated circuit (IC) to an antenna through a hole in a substrate. In other examples, methods for assembling RFID tags from a singulated IC or diced ICs still on a dicing frame may be disclosed. The disclosed methods may use a single metal layer for producing RFID tags with multi-turn loop antenna.

20 Claims, 6 Drawing Sheets

TAG ASSEMBLY METHODS

CROSS REFERENCE TO RELATED APPLICATIONS

This application claims the benefit of U.S. Provisional Patent Application Ser. No. 62/530,198 filed on Jul. 9, 2017, U.S. Provisional Patent Application Ser. No. 62/534,686 filed on Jul. 20, 2017, and U.S. Provisional Patent Application Ser. No. 62/538,735 filed on Jul. 30, 2017. The disclosures of the provisional patent applications are hereby incorporated by reference in their entireties.

BACKGROUND

Unless otherwise indicated herein, the materials described in this section are not prior art to the claims in this application and are not admitted to be prior art by inclusion in this section.

Radio Frequency Identification (RFID) systems may typically include RFID tags and RFID readers. An RFID tag may typically include an antenna comprising metal traces on a substrate, and an integrated circuit (IC) die. Conventional RFID tag assembly methods may require accurate alignment of an antenna layer and the IC to ensure proper coupling of the antenna to Radio Frequency (RF) distribution bus through connection patches. Commonly, the tag assembly may be performed using flip chip method, wherein an IC may be picked up and flip mounted on the substrate and may aligned to the prefabricated antenna traces on the substrate. Sometimes, metal bumps may be used to connect the antenna connections with RF pads on the IC. This means a post-processing step with high-precision die placement onto the antenna trace and tightly controlled die mount force may be required to apply the metal (gold) bumps. One of the disadvantage with this method is use of conductive adhesives that may require continuous pressure and heat during cure, resulting in limitations of assembly throughput. Other disadvantage is the cost of the materials and the assembly processes may typically comprise a large portion of the cost of the RFID tag.

Furthermore, for RFID tags, operating in the high frequency (HF) spectrum of the radio frequency band, for example at 13.56 MHz used for near field communications (NFC), loop antenna with multiple turns may be used. For loop antennas, having multiple turns, the antenna may usually be prepared with a multilayer process, including the fabrication of vias and a bridging metal layer, in order to connect the two terminals of the antenna. This multilayer process is much more expensive than a single layer process that may be used to prepare the loop or dipole antennas.

Accordingly, a need continues to exist to develop methods and systems that can reduce the handling cost and speed up the REID tag assembly process.

SUMMARY

Briefly stated, embodiments are directed to assembling an RFID tag through wire bonding techniques. In some examples, the RFID tag may be assembled by wire bonding of an RFID integrated circuit (IC) to an antenna through a hole in a substrate. In other examples, methods for assembling RFID tags from a singulated IC or diced ICs still on a dicing frame may be disclosed.

According to some examples, a method is provided to assemble a radio frequency identification (RFID) tag. The method may include providing, an antenna on a substrate, providing an opening in a surface of the substrate, aligning an RFID die in the opening of the substrate; and connecting the RFID die to the antenna through wire bonding.

According to other examples, a method is provided to manufacture radio frequency identification (RFID) tags from a plurality of RFID dice bonded on a dicing tape. The method may include providing a plurality of antennas on a substrate, wherein each antenna includes an opening in the substrate near a first antenna terminal, aligning the first RFID die to a first opening in a surface of the substrate, connecting the first RFID die to the first antenna by wire bonding, moving the substrate to pull a first RFID die from the dicing tape; and moving the substrate to align a second RFID die from the dicing tape to a second antenna.

According to further examples, a system is provided for a radio frequency identification (RFID) tag assembly. The system may include a printing component configured to provide an antenna on a substrate, an etching component configured to provide an opening in a surface of the substrate, a coating component configured to coat the antenna with an insulating film, an aligning component configured to align an RFID die in the opening of the substrate, a bonding component configured to connect the RFID die to the antenna through wire bonding, and a controller coupled to the printing component, the etching component, the coating component, the aligning component and the bonding component, wherein the controller is configured to manage operations of the printing component, the etching component, the coating component, the aligning component and the bonding component by executing one or more instructions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
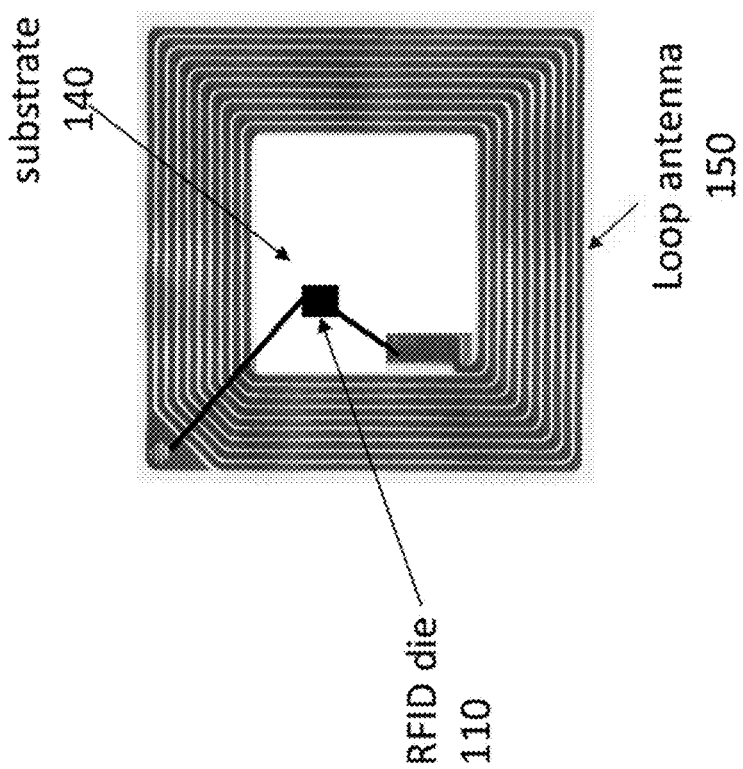
FIG. 1 is a conceptual diagram illustrating an example assembled RFID tag employing conventional assembly methods.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn, among other things, to methods, systems, and/or devices related to assembling an RFID tag through wire bonding.

Briefly stated, embodiments of the present teachings generally relate to methods for assembling an RFID tag using wire bonding techniques. In some examples, the RFID tag may be assembled by wire bonding of an RFID integrated circuit (IC) to an antenna through a hole in a substrate. In other examples, a single metal layer on the substrate may be employed for manufacturing RFID tags with multi-turn loop antennas. Furthermore, the methods may be disclosed for assembling RFID tags from a singulated IC or diced ICs still on a dicing frame.

Embodiments are directed to Radio Frequency Identification (RFID) systems, which may include RFID tags and RFID readers in various radio frequency ranges (e.g., HF, UHF), but also near field communication (NFC) systems. A tag according to embodiments may include an antenna comprising metal traces on a substrate and an integrated circuit (IC) die. In some embodiments, a tag may be operable in two frequency bands with two corresponding antennas (e.g., HF and NFC or UHF and NFC). In such embodiments, up to four bond wires may be used for attachment if the IC to the antennas.

FIG. 1 is a conceptual diagram illustrating an example assembled RFID tag employing conventional assembly methods, arranged in accordance with at least some embodiments described herein.

As shown in diagram 100, an antenna trace may be formed as a thin trace of metal layer on a substrate 140 such as Polyethylene Terephthalate (PET) substrate. The substrate 140 may comprise a multi-turn loop antenna 150 usually used for high frequency (HF) RFID tags, such as a NFC tag. The loop antenna 150 may comprise two metal layers with a via layer connecting the two metal layers. An RFID IC may usually comprise at least two metal pads. The metal pads may further present on the metal layers of the loop antenna 150, used to connect the RFID IC to the loop antenna 150. The RFID IC in a shape of a bare die 110 may mounted on the metal pads through flip-chip method. In some examples, the metal pads may be used to grow metal bumps (e.g. gold bumps) that may be utilized to make contact with antenna traces.

One disadvantage of conventional tag assembly method is that a cost for assembled RFID tag is partly high due to the cost of fabricating the antenna trace, the cost of the substrate and conductor, the cost of adhesives, and the cost of mounting the IC onto the substrate and connecting the antenna to the IC.

Figure 2:
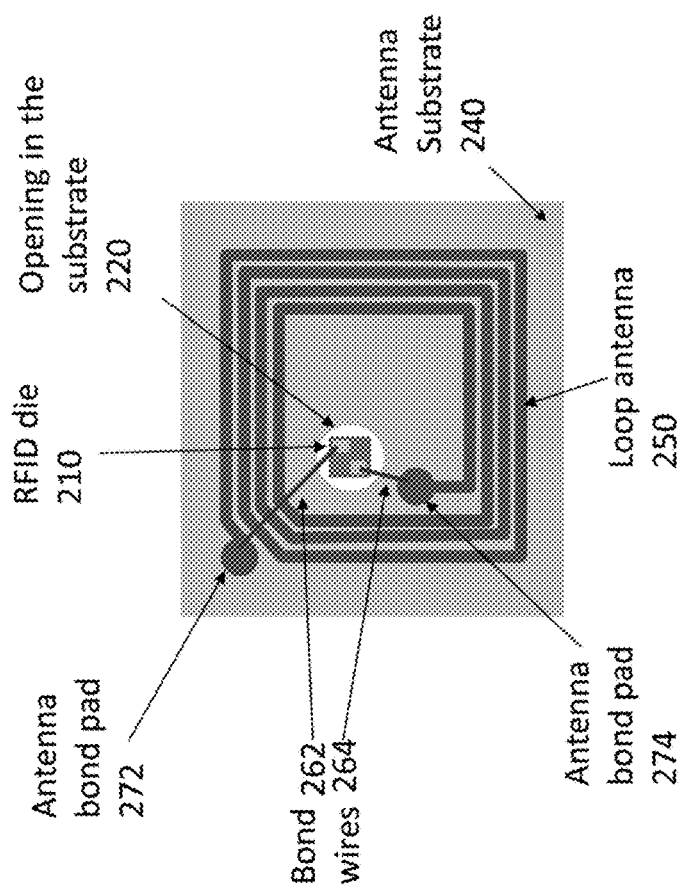
FIG. 2 illustrates an example assembled RFID tag.

The FIG. 2 illustrates an example assembled RFID tag, arranged in accordance with at least some embodiments described herein.

As shown in diagram 200, an antenna may comprise a multi-turn loop antenna 250. The loop antenna 250 may comprises a single layer of conductive traces formed on a substrate 240. The conductive traces formed on the substrate may comprise patterning of metal, wherein the metal may be one of: aluminum, silver, copper, gold, nickel, an alloy, or other conductive materials such as conducting carbon or conductive polymers. The antenna traces may be formed by etching, foil stamping, and screen-printing. The substrate 240 may comprises a non-conductive material such as paper or plastic. The substrate 240 may further comprise polyethylene terephthalate (PET), polymer, PVC, phenolics, polyesters, or styrene. The loop antenna 250 may then comprises two terminals or antenna bond pads, 272 and 274. An RFID die 210 may be configured to operate in a frequency range including one of: 13.56 MHz, 915 MHz, 860 MHz, or 2.4 GHz of a radio frequency spectrum. The RFID die may be configured to be able to operate in two frequency bands, for example 13.56 MHz and 915 MHz bands. The multi-turn loop antenna 250 may include as few as one turn or as many as 100 turns.

According to some embodiments, an opening or a hole 220 may be provided in a surface of the substrate 240. The opening may be provided preferably inside the loop and close to one or both the terminals (272, 274) of the loop antenna 250. The RFID die 210 may be configured to align in the opening with its face up. The RFID die 210 may be connected to the loop antenna through wire bonding. A first bond wire 262 may then be bonded to a first connecting pad of the RFID die 210 and to a first terminal 272 of the loop antenna 250 and a second bond wire 264 may be bonded to a second connecting pad of the RFID die 210 and the second terminal 274 of the loop antenna 250. In other embodiments, bond wires 262 and 264 may be configured to provide over the loop antenna 250.

Conventional wire bonding techniques, including ultrasound or thermo-sonic, may be used to bond the bond wires to the antenna trace and the RFID die in either ball or wedge shape.

To avoid shorting of the bond wires and the antenna traces, either the bond wires or the antenna traces or both may comprise coating with an insulating film prior to connecting the RFID die to the loop antenna. Alternatively, when bare bond wires are used to connect the RFID die to the loop antenna, the bond wires and antenna traces may be coated with the insulating film after the wire bonding.

Figure 3:
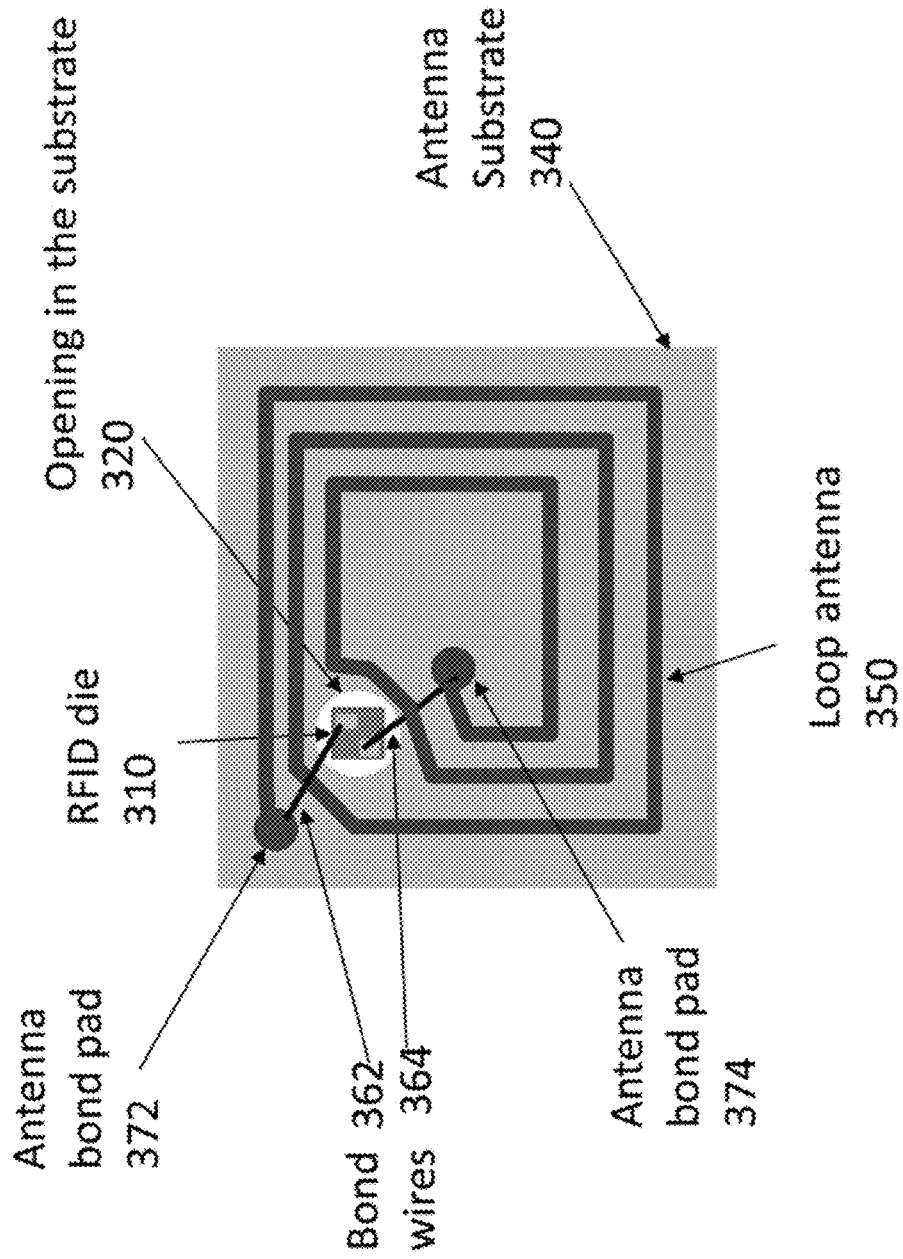
FIG. 3 illustrates another example assembled RFID tag.

The FIG. 3 illustrates another example assembled RFID tag, arranged in accordance with at least some embodiments described herein.

Diagram 300 shows a different schematic implementation of the example assembled RFID tag shown in FIG. 2. As Shown in diagram 300, an antenna may comprise a multi-turn loop antenna 350. The loop antenna 350 may comprising a single layer of conductive traces formed on a substrate 340. The loop antenna 350 may comprises two terminals or antenna bond pads, 372 and 374. An opening or a hole 320 may be provided in a surface of the substrate 340. The antenna trace may be configured to provide the opening/hole 320 and an RFID die 310 to be placed in between the successive turns of the antenna trace.

The RFID die 310 may be configured to align in the opening with its face up. the RFID die 310 may be connected to the loop antenna 350 through wire bonding. A first bond wire 362 may then be bonded to a first connecting pad of the RFID die and to a first terminal 372 of the loop antenna 350 and a second bond wire 364 may be bonded to a second connecting pad of the RFID die and the second terminal 374 of the loop antenna 350.

Figure 4:
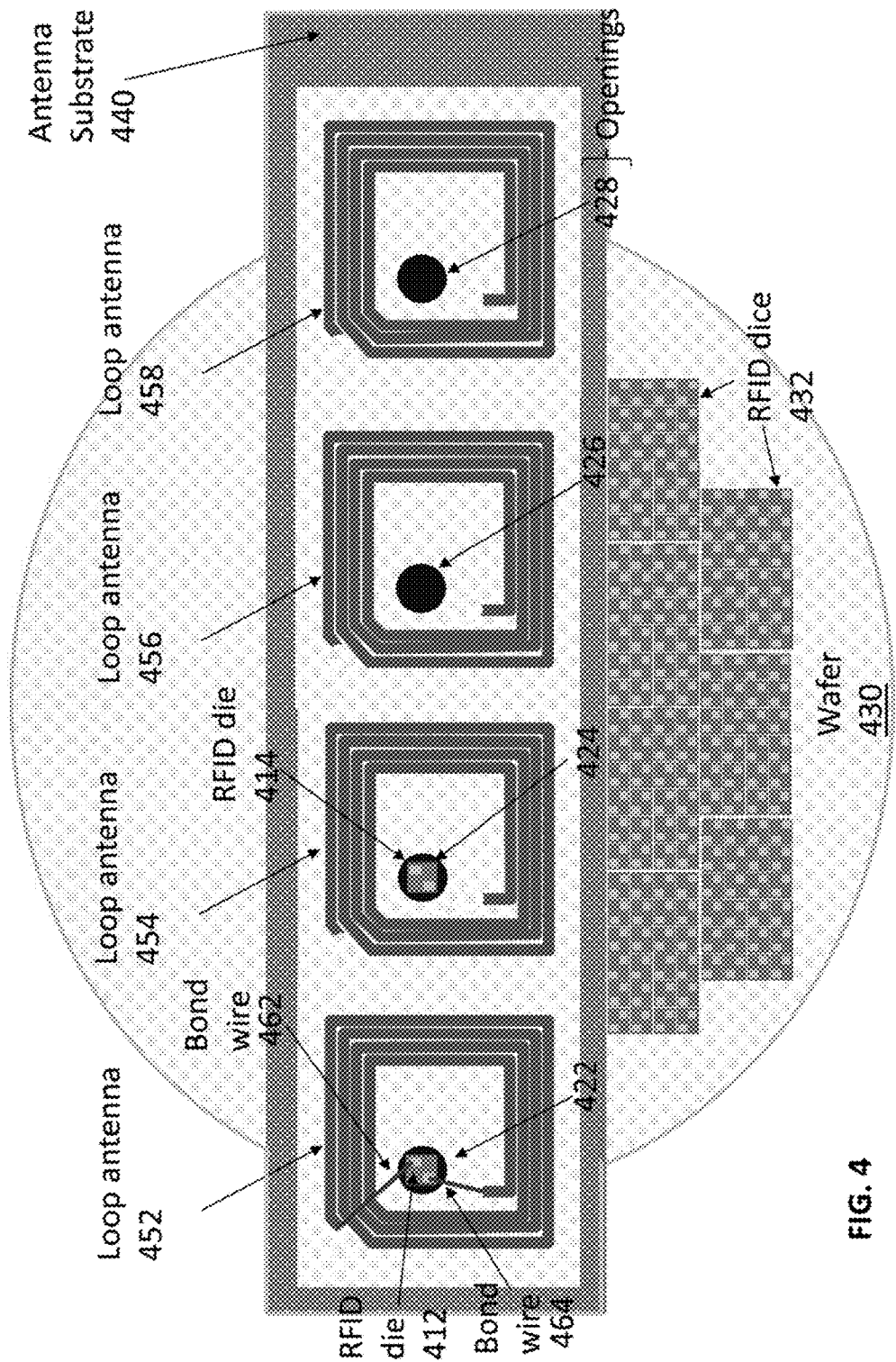
FIG. 4 is a schematic circuit diagram illustrating an example assembling RFID tags from RFID dice on a dicing tape according to one embodiment.

FIG. 4 is a schematic circuit diagram illustrating an example assembling RFID tags from RFID dice on a dicing tape, arranged in accordance with at least some embodiments described herein.

As shown in diagram 400, a plurality of antennas may be patterned on a substrate 440 and wire bonded on singulated RFID ICs that are still attached to a dicing tape. According to some embodiments, the plurality of loop antennas 452, 454, 456 and 458 may be provided on the substrate 440. The substrate 440 may comprise a paper material or PET. The plurality of loop antennas 452, 454, 456 and 458 may be supplied on the substrate in a roll. Further, each antenna may include an opening in the substrate near a first antenna terminal, wherein the opening may be pre-fabricated. For example, a first opening 422 may be pre-fabricated for a first loop antenna 452, a second opening 424 may be pre-fabricated for a second loop antenna 454, a third opening 426 may be pre-fabricated for a third loop antenna 456, and a fourth opening 428 may be pre-fabricated for a fourth loop antenna 458. A wafer 430 may be configured to provide a plurality of RFID dice 432, wherein the plurality of RFID dice may be diced and mounted on a dicing tape. The dicing tape may be attached to the wafer 430 placed on a movable stage.

The substrate 440 may be supplied in a roll to facilitate a roll to roll manufacturing. According to other embodiments, the substrate may be rolled so that an opening, for example, the first opening 422, may move close to a center of the wafer 430. The wafer 430 may then move to align the first opening 422 to be approximately centered on a first RFID die 412. The first RFID die 412 may be configured to align in the first opening 422. The first RFID die 412 may be connected to the first loop antenna 452 through wire bonding, wherein a first bond 462 wire may be bonded to a first pad of the RFID die and to a first terminal of the first antenna 452 and a second wire 464 may be bonded to a second pad of the RFID die and a second terminal of the first antenna 452. The substrate 420 may be then moved, for example, by rolling of the substrate, which in turn may pull the first RFID die 412 off the dicing tape.

An ejector pin may be employed to push the RFID die 412 off the dicing tape, at a same time the first RFID die 412 is being pulled off the dicing tape by the wires.

The process may be repeated for connecting the second RFID die 414 to the second loop antenna 454. The second loop antenna 454 may move to align the second opening 424 in the substrate to the second RFID die 414. The second RFID die 414 may then wire-bonded to the second loop antenna 454 and may be pulled off the dicing tape.

According to some embodiments, the antennas may be supplied on the substrate in a roll to facilitate roll to roll manufacturing and the assembly RFID tags may be rolled up in a second roll. This method of roll to roll assembly and from RFID dice still on the wafer frame may greatly reduce the handling cost and speed up the, assembly process.

The substrate may be supplied with no holes. Each hole is then punched before wire-bonding as part of the assembly process.

Figure 5:
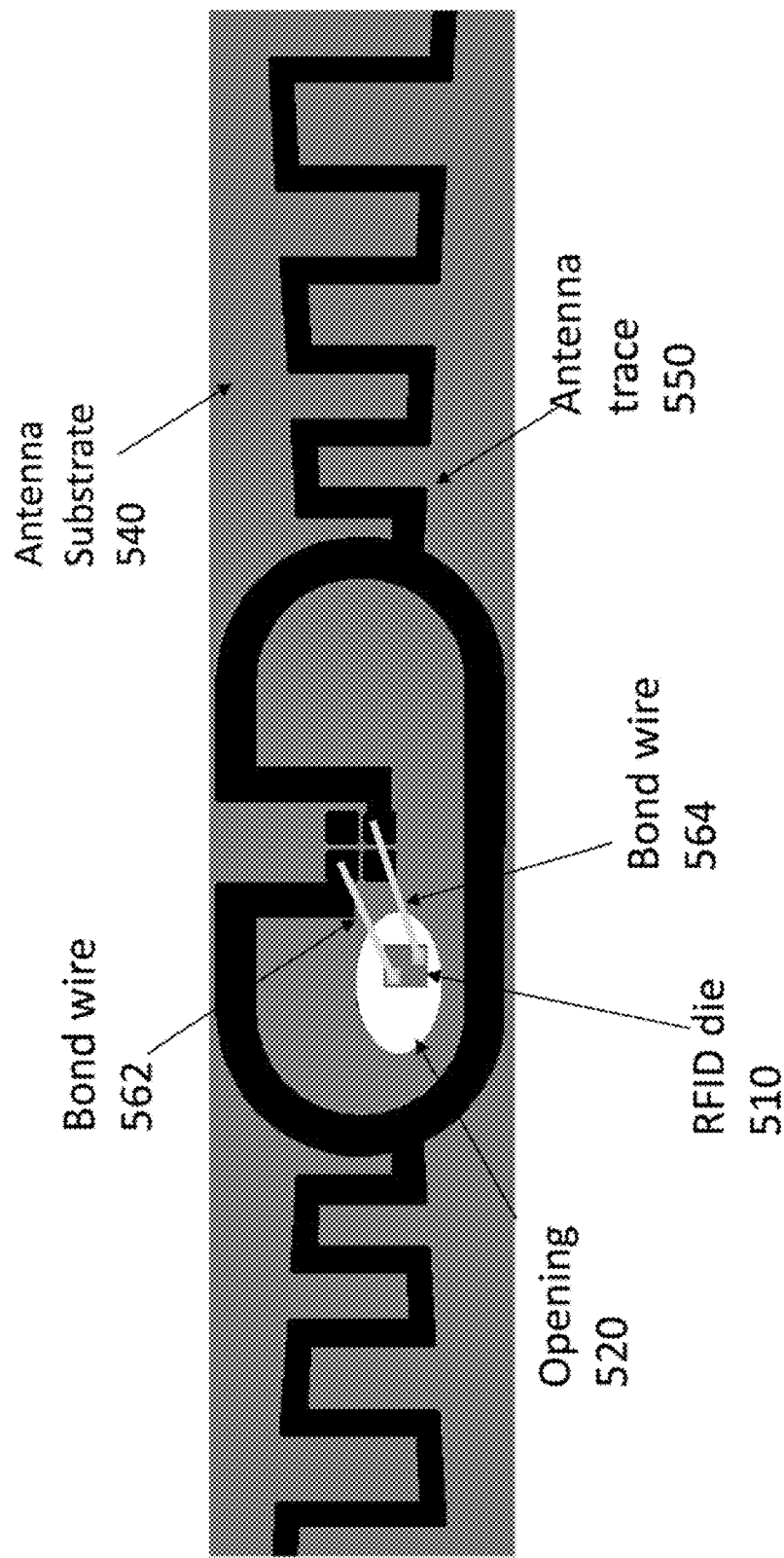
FIG. 5 illustrates an assembly of an ultrahigh frequency RFID a comprising a loop antenna and a dipole antenna according to another embodiment.

FIG. 5 illustrates an assembly of an ultrahigh frequency RFID tag comprising a loop and a dipole antenna, arranged in accordance with at least some embodiments described herein.

As shown in diagram 500, an antenna may be provided as a combination of a loop antenna and a dipole antenna for RFID tags operating in the ultrahigh frequency (UHF) region, for example, at around 915 MHz, of a radio frequency spectrum. The wire segments of the dipole antenna may be meandering, with bends. An RFID die 510 may be aligned to an opening 520 of a substrate 540. The RFID die may be then wire-bonded to an antenna trace 550 using bond wires 562 and 564. The substrate 540 may be supplied in a roll to facilitate roll to roll manufacturing. In some examples, the substrate may comprise a thick plastic sheet as used in access badges.

To avoid shorting of the bond wires and the antenna traces, either the bond wires (562, 564) or the antenna traces or both may comprise coating with an insulating film prior to connecting the RFID die 510 to the antenna trace. Alternatively, when bare bond wires are used, the bond wires and antenna traces may be coated with the insulating film after the wire bonding. The wire used for the wire bonding the antenna with the RFID die may be ductile conductors such as copper or aluminum. In addition, gold wires may be used for the wire bonding as well but may incur a higher cost. The bond wire diameter may be in the range of 10 microns to 500 microns.

In some examples, the disclosed wire-bonded RFID tag may be configured to operate in a Near Field Communication (NFC) region, including 13.56 MHz, of a radio frequency spectrum.

In some examples, the disclosed wire-bonded RFID tag may be configured to operate in both the HF region as a Near Field Communication (NFC) tag, including 13.56 MHz, of a radio frequency spectrum, and the UHF region.

In other examples, there are may be more than two wire bonds, for example, three, or four wire bonds.

Figure 6:
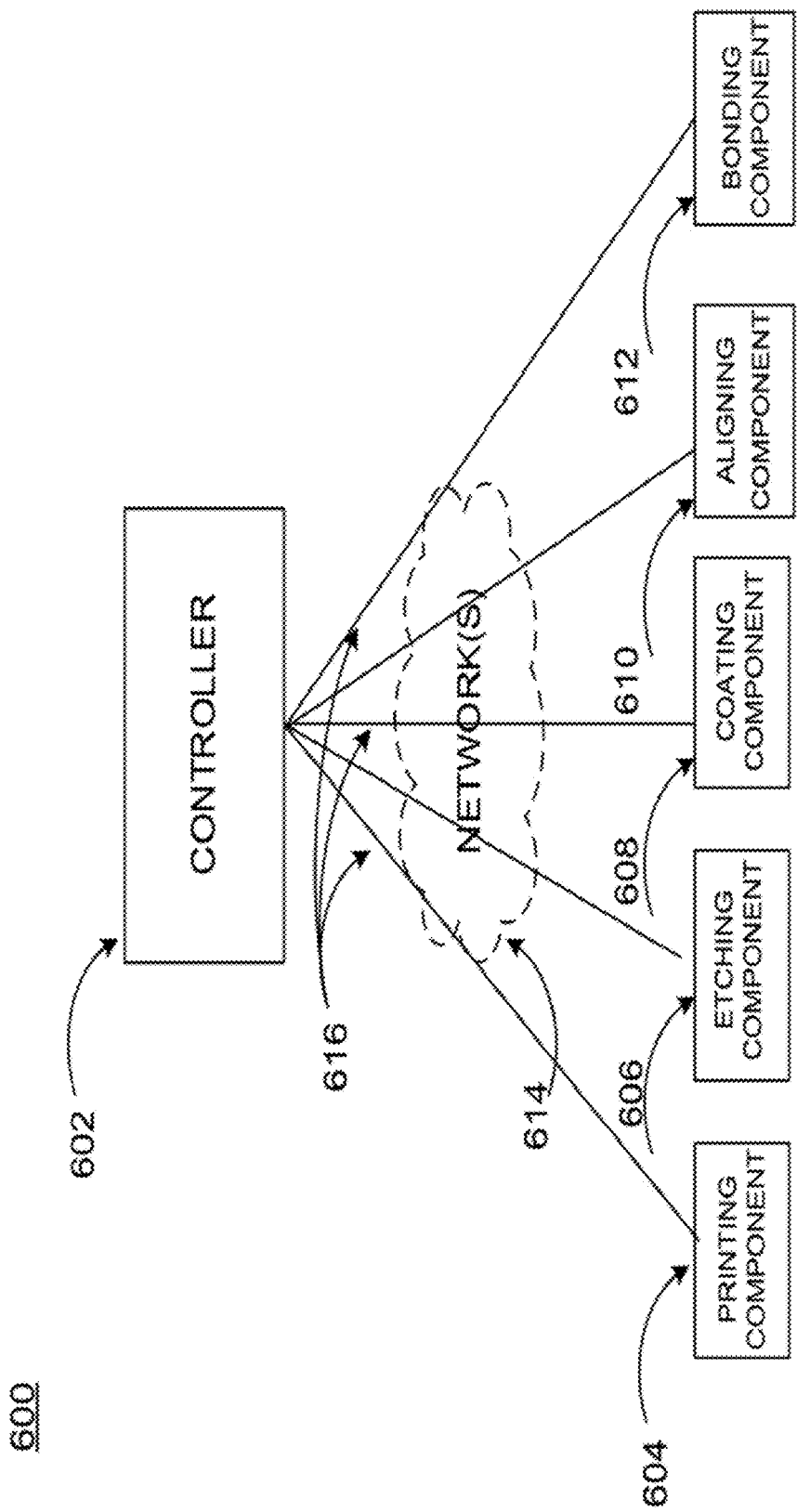
FIG. 6 illustrates an example system for Radio Frequency Identification (RFID) tag assembly, all arranged according to at least some embodiments presented herein.

FIG. 6 illustrates an example system for Radio Frequency Identification (RFID) tag assembly, arranged in accordance with at least some embodiments described herein.

Diagram 600 includes an example system for RFID tag assembly with a controller 602, a printing component 604, an etching component 606, a coating component 608, an aligning component 610, and a bonding component 612. In some embodiments, the controller 602 may be directly coupled to the printing component 604, the etching component 606, the coating component 608, the aligning component 610, and the bonding component 612 in an integrated system. In other embodiments, the controller 602 may be a remotely located controller that is communicatively coupled to the printing component 604, the etching component 606, the coating component 608, the aligning component 610, and the bonding component 612. In still other examples, one or more network(s) 614, either wired or wireless, may be configured to provide communicative coupling between the controller 602 and printing component 604, the etching component 606, the coating component 608, the aligning component 610, and the bonding component 612.

The controller 602 may be configured to coordinate operations of one or more of the printing component 604, the etching component 606, the coating component 608, the aligning component 610, and the bonding component 612, as well as other optional components (not shown) such as a scribing component, an annealing component, and similar ones. In some examples, the controller 602 may coordinate the operation of the various components via operation of one or more control signals 616. The various control signals 616 may be of a digital format or an analog format, as may be required to interface with the corresponding component. Each signal may be generated (e.g., asserted, de-asserted, pulsed, transmitted/received, communicated, etc.) in response to operation of instructions, in some examples.

The controller 602 may correspond to a software controller, a hardware controller, or a combination thereof. Example controllers may include one or more computers, general purpose processors, special purpose processors, circuits, application specific integrated circuits (ASICs) or combinations thereof. Example processors may include micro-processors, micro-controllers, complex instruction set computer (CISCs) processors, reduced instruction set computer (RISC), or other similar variations thereof. The operation of some controller implementations may include execution of hardware based instructions such as from firmware, software based instructions, or combinations thereof.

The printing component 604 may be configured to provide an antenna on a substrate, wherein the antenna may comprise a loop antenna and/or a dipole antenna. The loop antenna may comprise a multi-loop antenna. In some examples, a preprinted antenna may be supplied to the assembly system for making a hole and wire-bonding. The etching component 606 may be configured to provide an opening in a surface of the substrate. The aligning component 610 may be configured to align an RFID die in the opening of the substrate. The bonding component 612 may be configured to connect the RFID die to the antenna through wire bonding. The coating component 608 may be configured to provide coating of the antenna with an insulating film either before or after the wire bonding of the antenna with the RFID die.

Embodiments are not limited to the example components of diagram 600. A system to RFID tag assembly may include additional or fewer components, and some of the operations may be combined to be performed by the same components. For example, the system 600 may have no printing component 604. Substrate with preprinted antennas is fed to the system 600 and holes made for each antenna by the etch component 606, followed by the alignment and wire-bonding process modules. In further examples, the etching component 606 may be a removal component to remove portions of the substrate through other means such as punching holes.

According to some examples, a method is provided to assemble a radio frequency identification (RFID) tag. The method may include providing an antenna on a substrate, providing an opening in a surface of the substrate, aligning an RFID die in the opening of the substrate; and connecting the RFID die to the antenna through wire bonding.

According to some embodiments, providing the antenna on the substrate may comprises providing a loop antenna. The method may further include providing the antenna on the substrate comprises providing a multi-loop antenna. Providing the multi-loop antenna may comprises providing a single layer of conductive traces formed on the substrate. The method may further include providing the single layer of conductive traces on the substrate comprises patterning of metal, wherein the metal is one of: aluminum, silver, copper, gold, nickel, or an alloy. The method may further include providing the antenna on the substrate comprises providing a dipole antenna. The method may further include coating the antenna with an insulating film prior to connecting the RFID die to the antenna. The method may further include wherein the RFID die is configured to operate in a high-frequency region, including 13.56 MHz, and in an ultra-high frequency region, including 915 MHz, of a radio frequency spectrum.

According to other examples, a method is provided to manufacture radio frequency identification (RFID) tags from a plurality of RFID dice bonded on a dicing tape. The method may include providing a plurality of antennas on a substrate, wherein each antenna includes an opening in the substrate near a first antenna terminal, moving the substrate to pull a first RFID die from the dicing tape, aligning the first RFID die to a first opening in a surface of the substrate, connecting the first RFID die to the first antenna by wire bonding; and moving the substrate to push a second RFID die from the dicing tape.

According to some embodiments, wherein providing the plurality of antennas comprises supplying the plurality of antennas on the substrate in a roll, wherein the substrate may comprise a paper material or Polyethylene Terephthalate (PET). The method may further include employing an ejector pin to push the second RFID die from the dicing tape at the same time as the first die is being pulled from the dicing tape by a bond wire. The method may further include attaching the dicing tape to a wafer frame placed on a movable stage.

According to further examples, a system is provided for a radio frequency identification (RFID) tag assembly. The system may include a printing component configured to provide an antenna on a substrate, an etching component configured to provide an opening in a surface of the substrate, a coating component configured to coat the antenna with an insulating film, an aligning component configured to align an RFID die in the opening of the substrate, a bonding component configured to connect the RFID die to the antenna through wire bonding, and a controller coupled to the printing component, the etching component, the coating component, the aligning component and the bonding component, wherein the controller is configured to manage operations of the printing component, the etching component, the coating component, the aligning component and the bonding component by executing one or more instructions.

According to other embodiments, employing the bonding component to provide a first bond wire bonded to a first connecting pad of the RFID die and to a first terminal of the antenna and a second bond wire bonded to a second connecting pad of the RFID die and a second terminal of the antenna. The system may further include employing the printing component to provide a loop antenna and/or a dipole antenna. The system may further include wherein the substrate may be supplied in a roll to facilitate roll to roll manufacturing. The system may further include employing the coating component to coat the antenna with an insulating film after the antenna is wire bonded to the RFID die, wherein a wire used for the wire bonding the antenna with the RFID die may comprise copper or aluminum.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly hardware and/or firmware vehicle; if flexibility is paramount, the implementer may opt for mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs execution on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD) a digital versatile disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no, such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for assembling a radio frequency identification (RFID) IC to an antenna, comprising:
   providing an antenna on a substrate, wherein the antenna includes a first antenna terminal;
   providing an opening in a surface of the substrate, wherein the opening is near the first antenna terminal;
   aligning an RFID IC die in the opening of the substrate;
   connecting the RFID IC die to the antenna through wire bonding; and
   moving the substrate to pull the RFID die from a dicing tape to which the RFID IC die is bonded.

2. The method of claim 1, wherein providing the antenna on the substrate comprises providing a loop antenna.

3. The method of claim 2, wherein providing the antenna on the substrate comprises providing a multi-loop antenna.

4. The method of claim 3, wherein providing the multi-loop antenna comprises providing a single layer of conductive traces formed on the substrate, and wherein the conductive traces include one of: aluminum, silver, copper, gold, nickel, an alloy, conductive polymer, or a conductive film of carbon.

5. The method of claim 1, wherein providing the antenna on the substrate comprises providing a dipole antenna.

6. The method of claim 1, further comprising:
   providing the antenna trace as covered with an insulating film except at terminals.

7. The method of claim 1, wherein the RFID IC die is configured to operate in a high-frequency region, including 13.56 MHz, of a radio frequency spectrum.

8. The method of claim 1, wherein the antenna is configured to operate in an ultra-high frequency region, including 915 MHz, of a radio frequency spectrum.

9. The method of claim 1, wherein the RFID IC and the antenna are configured to operate in two frequency regions: a high frequency and an ultra-high frequency region of a radio frequency spectrum.

10. A method for manufacturing radio frequency identification (RFID) tags from a plurality of RFID dice bonded on a dicing tape, the method comprising:
    providing a plurality of antennas on a substrate, wherein each antenna includes an opening in the substrate near a first antenna terminal;
    aligning the first RFID die to a first opening in a surface of the substrate;
    connecting the first RFID die to a first antenna by wire bonding; and
    moving the substrate to pull the first RFID die from the dicing tape.

11. The method of claim 10, wherein providing the plurality of antennas comprises supplying the plurality of antennas on the substrate in a roll.

12. The method of claim 10, further comprising:
    employing an ejector pin to push the first RFID die from the dicing tape at a same time as the first RFID die is being pulled from the dicing tape by bond wires.

13. The method of claim 10, further comprising:
    attaching the dicing tape to a wafer frame placed on a movable stage.

14. The method of claim 10, wherein the substrate comprises a paper material, a plastic, or Polyethylene Terephthalate (PET).

15. A Radio Frequency Identification (RFID) tag assembly system, comprising:
    a printing component configured to provide an antenna on a substrate;
    a removal component configured to provide an opening in the substrate;
    a coating component configured to coat the antenna with an insulating film;
    an aligning component configured to align an RFID die in the opening of the substrate;
    a bonding component configured to connect the RFID die to the antenna through wire bonding; and
    a controller coupled to the printing component, the etching component, the coating component, the aligning component and the bonding component, wherein the controller is configured to manage operations of the printing component, the etching component, the coating component, the aligning component and the bonding component by executing one or more instructions.

16. The RFID tag assembly system of claim 15, further comprising:
    employing the bonding component to provide a first bond wire bonded to a first connecting pad of the RFID die and to a first terminal of the antenna and a second bond wire bonded to a second connecting pad of the RFID die and a second terminal of the antenna.

17. The RFID tag assembly system of claim 15, further comprising:
    employing the printing component to provide a loop antenna and /or a dipole antenna.

18. The RFID tag assembly system of claim 15, wherein the substrate is supplied in a roll to facilitate roll to roll manufacturing.

19. The RFID tag assembly system of claim 15, further comprising:
    employing the coating component to coat the antenna with an insulating film after the antenna is wire bonded to the RFID die.

20. The RFID tag assembly system of claim 15, wherein a wire used for the wire bonding the antenna with the RFID die is copper or aluminum.

* * * * *